US 6,556,389 B1

(12) United States Patent
Boutaghou et al.

(10) Patent No.: US 6,556,389 B1
(45) Date of Patent: Apr. 29, 2003

(54) METHOD FOR THERMALLY ISOLATING A MAGNETORESISTIVE ELEMENT FROM THERMAL ASPERITIES

(75) Inventors: Zine-Eddine Boutaghou, Vadnais Heights, MN (US); Bruno Jean Marchon, Palo Alto, CA (US); Jing Gui, Fremont, CA (US)

(73) Assignee: Seagate Technology, L.L.C., Scotts Valley, CA (US)

( * ) Notice: Subject to any disclaimer, the term of this patent is extended or adjusted under 35 U.S.C. 154(b) by 0 days.

(21) Appl. No.: 09/322,482

(22) Filed: May 28, 1999

Related U.S. Application Data

(60) Provisional application No. 60/088,122, filed on Jun. 4, 1998.

(51) Int. Cl.[7] .............................. G11B 5/39; G11B 5/187; G11B 5/60
(52) U.S. Cl. ...................... 360/320; 360/122; 360/235.2
(58) Field of Search ................................. 360/319, 320, 360/122, 234.3, 234.7, 234.9, 235.1, 235.2, 235.3, 235.7, 235.8, 236.5, 236.6

(56) References Cited

U.S. PATENT DOCUMENTS

| 5,198,934 A | * | 3/1993 | Kubo et al. ............... 360/235.2 |
| 5,335,126 A | * | 8/1994 | Tokyuama et al. ........ 360/244.2 |
| 5,617,273 A | * | 4/1997 | Carr et al. ................ 360/234.7 |
| 5,822,153 A | * | 10/1998 | Lairson et al. ............ 360/234.7 |
| 5,824,387 A | | 10/1998 | Boutaghou et al. ......... 428/65.5 |
| 5,825,181 A | | 10/1998 | Schaenzer et al. ........... 324/212 |
| 5,863,237 A | | 1/1999 | Felts et al. ..................... 451/41 |
| 5,864,452 A | * | 1/1999 | Hirano et al. ............. 360/235.1 |
| 5,898,532 A | | 4/1999 | Du et al. ....................... 360/46 |
| 5,901,001 A | | 5/1999 | Meyer et al. ................... 360/25 |
| 5,986,851 A | * | 11/1999 | Angelo et al. ................ 83/767 |
| 6,038,101 A | * | 3/2000 | Yoda et al. ............... 360/235.2 |

FOREIGN PATENT DOCUMENTS

| EP | 142781 | * | 5/1985 |
| JP | 05-028429 | * | 2/1993 |
| JP | 08-045045 | * | 2/1996 |

* cited by examiner

Primary Examiner—David L. Ometz
(74) Attorney, Agent, or Firm—Kinney & Lange, P.A.

(57) ABSTRACT

A reader and a method of fabricating a reader having a thermally isolated magnetoresistive element is disclosed. The method includes fabricating a magnetoresistive read transistor between a top shield and a bottom shield. The magnetoresistive read transistor is then coated with a thermally isolating material. The magnetoresistive read transistor can be coated with a zirconia compound such as zirconium diboride. For additional thermal isolation, a layer of diamond-like carbon can be deposited over the thermally isolating material.

25 Claims, 3 Drawing Sheets

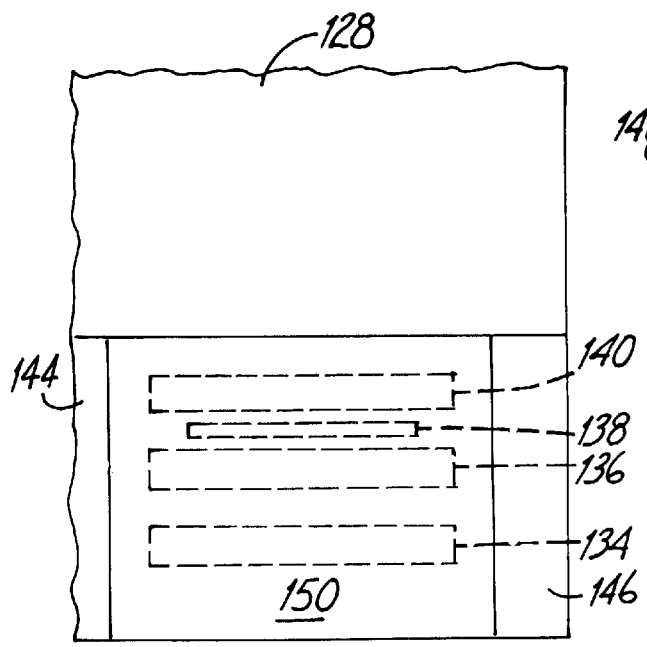
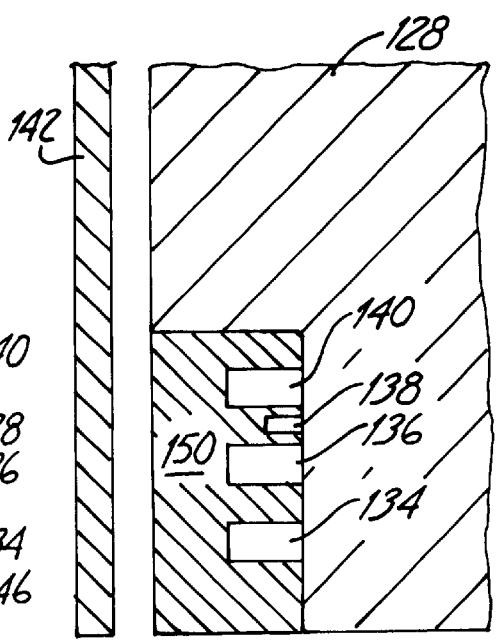
Fig. 4A  Fig. 4B
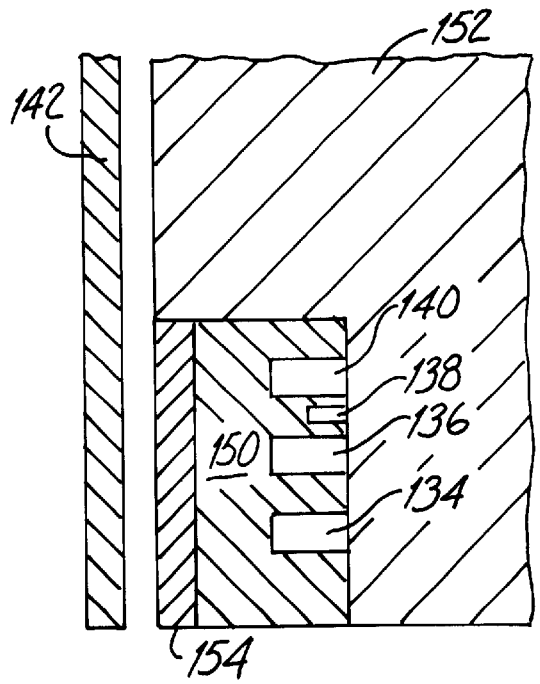
Fig. 5

METHOD FOR THERMALLY ISOLATING A MAGNETORESISTIVE ELEMENT FROM THERMAL ASPERITIES

CROSS-REFERENCE TO RELATED APPLICATION(S)

This application is based upon and claims priority from U.S. Provisional Application No. 60/088,122, filed Jun. 4, 1998.

BACKGROUND OF THE INVENTION

The present invention relates generally to a magnetoresistive head for use in a magnetoresistive read device. In particular, the present invention is a magnetoresistive reader and method of fabricating a magnetoresistive reader which thermally isolates a magnetoresistive element from thermal asperities caused by imperfections in a magnetic medium or disc.

A magnetoresistive head consists of two portions, a writer portion and a reader portion, positioned adjacent each other. The inductive writer portion writes magnetically encoded information to a magnetic medium or disc.

A magnetoresistive reader portion of a magnetic head retrieves magnetically-encoded information that is stored on a magnetic medium or disc. The magnetoresistive reader is typically formed of several layers that include a top shield, a bottom shield, a read element, a bias layer, and a spacer layer. The read element, bias layer, and spacer layer are positioned between a top and bottom shields. The read element is fabricated from a magnetoresistive composition, typically a ferromagnetic material such as nickel-iron (NiFe). The bias layer properly biases the read element along an easy axis of lower coeractivity and the spacer layer provides the necessary separation between the read element and the bias layer.

The read element is fabricated on the read head such that the easy axis is transverse to the direction of disc rotation and parallel to the plane of the disc. Magnetic flux from the disc's surface causes rotation of the magnetization vector of the read element, which in turn causes a change in electrical resistivity of the read element. The change in resistivity of the read element can be detected by passing a sense current through the read element and measuring a voltage across the read element. External circuitry then converts the voltage information into an appropriate format and manipulates that information as necessary.

Due to the low-flying nature of a read head, i.e. the read head is positioned within picometers or femtometers to a rotating disc in state-of-the-art technologies, the magnetoresistive reader is susceptible to disc projections or mechanical asperities, which interfere with the read process. Asperities on the disc can come into direct contact with a magnetoresistive read element. When a magnetoresistive read element contacts a mechanical asperity on a disc, the read element undergoes frictional heating and the resistance of the magnetoresistive sensor changes accordingly. This event has been termed a "thermal asperity". A signal spike, having a duration of 1–3 microseconds, will result. During this period, the read element is unable to properly read information from the rotating disc.

Another situation which may inhibit or alter the magnetoresistive reader from properly reading the information stored on a disc stems from the disc having a warped surface, rather than a perfectly planar surface. The magnetoresistive read element is biased causing it to be hot relative to its surroundings. The sensor flies very close to the disc which acts as a large heat sink. The proximity of the read element to the disc changes the rate of cooling of the read element and thereby changes the resistive properties of the read element. Dynamic changes in flying height due to a warped surface, disc and head modulation, and near contact with asperities can all lead to baseline shifts in the resistance of the read element, thereby inhibiting its reading capabilities.

There is a need for a magnetoresistive read transducer that will not be affected by disc projections or mechanical asperities. Thus, the thermal asperities will not cause corruption of the read process.

BRIEF SUMMARY OF THE INVENTION

The present invention is a reader and a method of fabricating a reader having a thermally isolated magnetoresistive element. The method includes fabricating a magnetoresistive read transistor between a bottom shield and a top shield. The magnetoresistive read element is coated with a thermally isolating material. In one preferred embodiment, the magnetoresistive read element is coated with a zirconia compound, such as zirconium diboride. A zirconia compound exhibits high strength, high fracture toughness, and high resistance to impact and cracking. In one preferred embodiment, the zirconia compound can be applied by a magnetron sputtering process in the pole tip region using a photolithography mask.

BRIEF DESCRIPTION OF THE DRAWINGS

FIG. 4A is a front-view of the present invention showing a portion of a slider having a magnetoresistive head coated with a thermally isolating material.

FIG. 4B is a sectional view of the present invention showing a portion of a slider having a magnetoresistive head coated with a thermally isolating material.

FIG. 5 is a sectional of an alternate embodiment of the present invention showing a portion of a slider including a magnetoresistive head.

DETAILED DESCRIPTION

The present invention is a magnetoresistive (MR) reader and a method of fabricating a MR reader which thermally isolates a MR read element from thermal asperities caused by imperfections in a magnetic medium or disc. A MR read element is biased causing it to be hot relative to its surroundings. Thus, a magnetic medium or disc can act as a heat sink when the fly height between the MR element and the disc varies. Therefore, an undesired change in the resistance of a MR element is the result, causing errors in the reading of information stored on the disc.

Figure 1A:
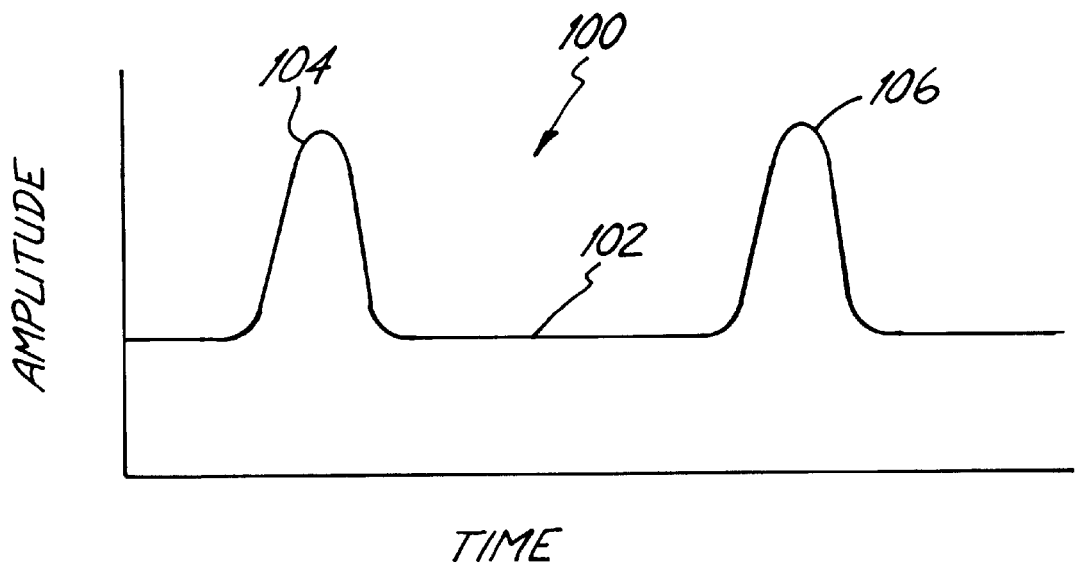
FIG. 1A is a graph depicting a typical signal stored on a magnetic medium or disc.

FIG. 1A shows graph 100 depicting typical signal 102 stored on a magnetic medium or disc. As shown in FIG. 1A, transitions 104 and 106 represent a bit of information stored on the disc. Ideally, a magnetic reader portion of a MR head can read signal 102 as written to a disc and as shown in FIG. 1A. However, there are imperfections in the read system or on the disc which cause degradation of the read signal.

Two examples of situations which degrade the reading process are mechanical asperities on the surface of the disc or a warped surface of the disc. The current trend in this technology is towards positioning a read element closer and closer to the disc. For example, a read height in the picometer or femtometer range is not unusual. With this minimal fly height, mechanical asperities on a disc can come in direct contact with the MR read element. When the MR read element comes in contact with a mechanical asperity, the read element undergoes frictional heating and the resistance of the MR element changes accordingly. During this period, the read element is unable to properly read information from the rotating disc. Likewise, a warped surface of a disc causes changes in fly height, which in turn changes the resistance of the MR element.

The present invention prevents unwanted variations in a read signal due to thermal asperities or a warped disc, while still allows for proper reading of a desired signal from the disc.

Figure 1B:
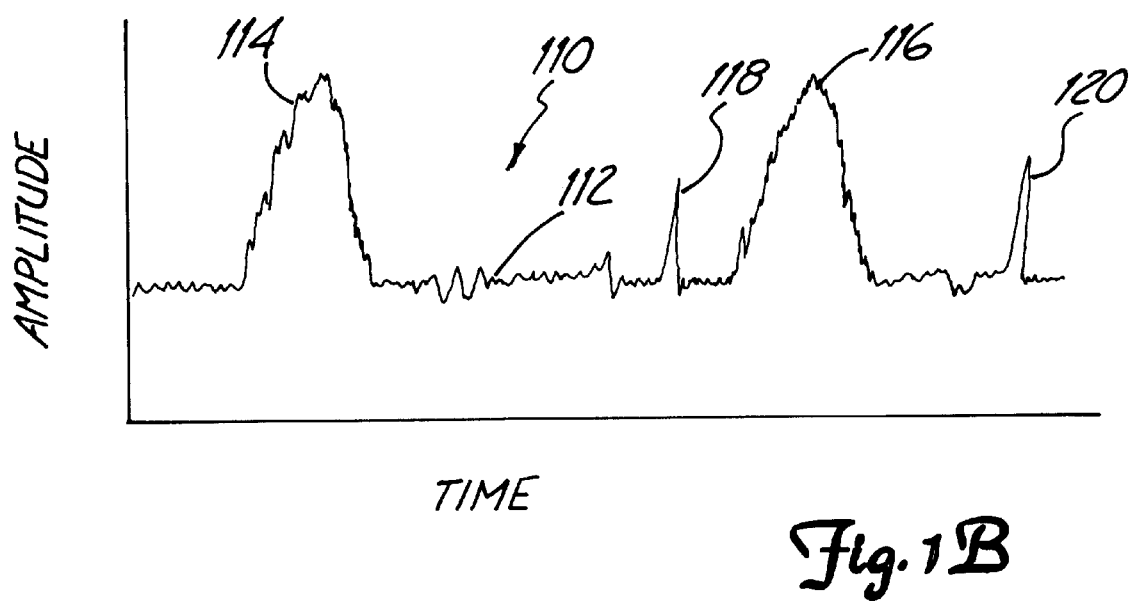
FIG. 1B is a graph depicting a typical signal read from a magnetic storage medium or disc by a magnetoresistive reader.

FIG. 1B shows graph 110 having signal 112. Signal 112 includes transitions 114 and 116 which represent a bit of information read from a disc. Signal 112 also includes transitions 118 and 120 which represent the change in resistivity of the read element due to a thermal asperity. During these transitions, the read element is incapable of properly reading information from the disc. Signal 112 also includes a continuous wave-like signal superimposed onto signal 112. This superimposed signal represents a change in the resistance of the MR read element due to variations in the fly height.

Figures 2A, 2B:
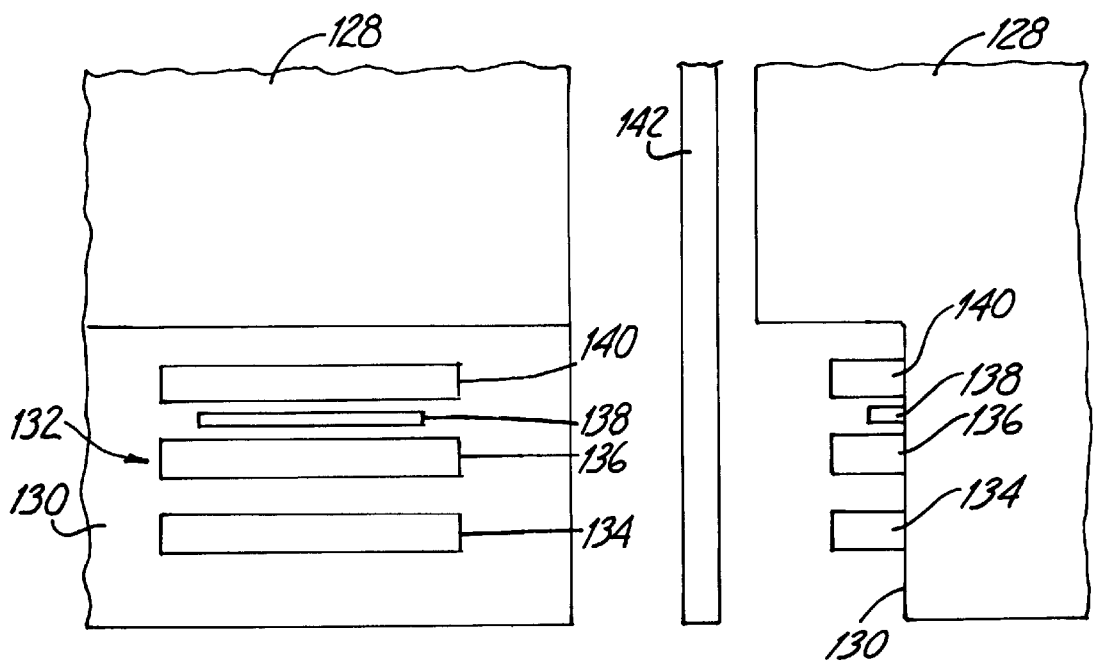
FIG. 2A is a front-view of a portion of a slider incorporating a magnetoresistive head.
FIG. 2B is a side-view of a portion of a slider incorporating a magnetoresistive head.

FIGS. 2A and 2B are a front-view and a side-view of a portion of slider 128 incorporating MR head 132 on the rail 130. MR head 132 includes bottom pole 134, top pole/bottom shield 136, reader 138, and top shield 140. For clarity sake, the portions of the writer between bottom pole 134 and top pole 136 have been removed. In addition, while a single element, reader 138, is shown between bottom shield 136 and top shield 140, it is understood by those in the art that reader 138 can include several elements such as an MR element, a spacer layer, a soft adjacent layer, and multiple other layers as necessary. Also shown in FIG. 2B is disc 142. During a read operation, reader 138 reads information from disc 142 via a MR element. The resistance of the MR element changes in the presence of a transition such as transitions 104 and 106 or FIG. 1A. This change in resistivity can be manipulated by external circuitry to recover the information from the disc.

Figure 3:
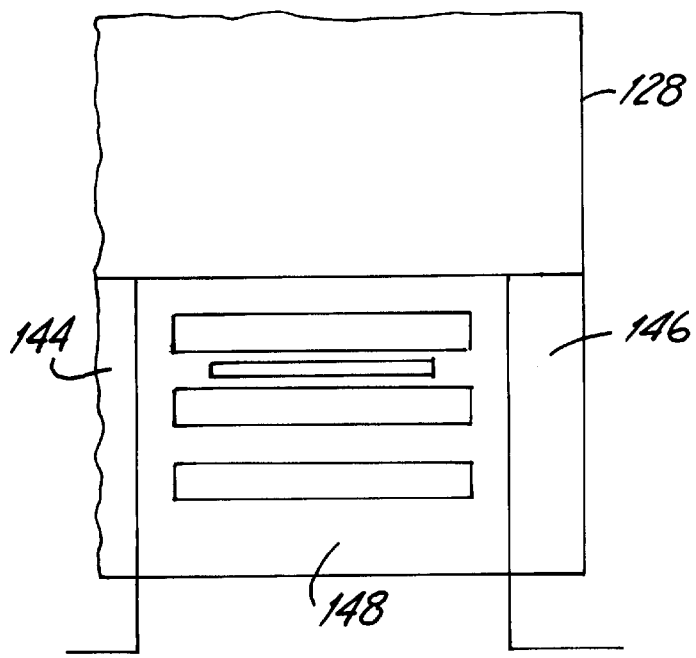
FIG. 3 is a front-view of a portion of a slider which includes a magnetoresistive head.

FIG. 3 is a front-view of a portion of slider 128. As shown in FIG. 3, a photolithography mask has been put down covering portions 144 and 146 of rail 130. However, portion 148 remains uncovered by the photolithography mask. A thermally isolating material is then fabricated within portion 148 of rail 130. Examples of a thermally isolated material which can be used are zirconia compounds such as zirconium diboride ($ZrB_2$) and partially stabilized zirconia ($ZrO_2$—$Y_2O_3$). Zirconia compounds exhibit high-strength, high-fracture toughness, and high-resistance to impact and cracking. These materials can be fabricated by a magnetron sputtering process over portion 148 of the pole tip region of rail 130.

FIGS. 4A and 4B are a front-view and a side sectional view of the present invention showing a portion of slider 128 having MR head 132 coated with a thermally isolating material, such as those discussed above. As shown in FIGS. 4A and 4B, thermally isolating material 150 has been fabricated over portion 148 of rail 130. The thickness of thermal barrier 150 can be adjusted during the magnetron sputtering process. As shown in FIGS. 4A and 4B, thermal barrier 150 has been fabricated such that it equals the pole tip recission on rail 130. This planarizes the air bearing surface of slider 128.

Thermal barrier 150, formed of a thermally isolating material such as zirconium diboride or partially stabilized zirconia, dissipates heat generated due to either direct contact with a mechanical asperity on a disc or other thermal asperities due to variations in the fly height of MR head 132 with respect to a disc. Thus, thermal barrier 150 prevents any change in an MR read-back signal due to unwanted thermal or mechanical asperities.

FIG. 5 is side sectional view showing an alternate embodiment of the present invention. As with the embodiment shown in FIGS. 4A and 4B, a thermally isolating material such as zirconium diboride or partially stabilized zirconia would be fabricated through use of a magnetron sputtering process. However, in the embodiment shown in FIG. 5, the thermally isolating material is not planarized with the air bearing surface of slider 152. Rather, a portion of the pole tip recision remains. A second mask is laid down, similar to the mask shown in FIG. 4A and a layer of diamond-like carbon is deposited. The diamond-like carbon is planarized such that it is flush with the remaining portion of slider 152. Diamond-like carbon layer 154 assists in the dissipation of heat generated due to thermal asperity contact with a disc. Diamond-like carbon layer 154 also reduces wear and lowers frictional forces during a read operation.

The present invention does not negatively impact the magnetic spacing of a slider since the thermally isolating material merely fills the existing pole tip recession. Depending on the thickness of the isolation material, two scenarios are expected. First, a reduction in the amplitude of the thermal asperities which will permit proper reading of the desired information more accurately. In addition, the rise time of a thermal asperities will be reduced which may enable recovery of the desired data even under contact with a mechanical asperity. Second, for a thick layer of zirconia, there will be no thermal asperities even during contact with mechanical asperities on the disc.

Although the present invention has been described with reference to preferred embodiments, workers skilled in the art will recognize that changes may be made in form and detail without departing from the spirit and scope of the invention.

What is claimed is:

1. A reader supported by a slider, the reader being recessed from an air bearing surface of the slider adjacent the reader by a pole tip recession, the reader comprising:

a magnetoresistive read transducer positioned between a top shield and a bottom shield; and means for thermally isolating the magnetoresistive read transducer, the means for thermally isolating being positioned between the magnetoresistive read transducer and each of the air bearing surface, the top shield, and the bottom shield.

2. The reader of claim 1 wherein the means for thermally isolating comprises:

a coating of a thermally isolating material fabricated over the magnetoresistive read transducer.

3. The reader of claim 2 wherein the thermally isolating material is a zirconia compound.

4. The reader of claim 2 wherein the thermally isolating material is zirconium diboride.

5. The reader of claim 2 wherein the coating is formed by magnetron sputtering of the thermally isolating material onto the magnetoresistive read transducer through use of a photolithography mask.

6. The reader of claim 2 and further comprising:
a layer of diamond-like carbon deposited over the thermally isolating material, the layer of diamond-like carbon not extending beyond the air bearing surface.

7. The reader of claim 2 wherein the thermally isolating material is partially stabilized zirconia $ZrO_2$—$Y_2O_3$.

8. A reader supported by a slider, the reader being recessed from an air bearing surface of the slider adjacent the reader by a pole tip recession, the reader comprising:
a magnetoresistive read element positioned between a top shield and a bottom shield; and
a thermally isolating material that surrounds the magnetoresistive read element in the pole tip recession such that the thermally isolating material is positioned between the magnetoresistive read element and each of the top shield, the bottom shield and the air bearing surface.

9. The reader of claim 8 wherein the thermally isolating material is a zirconia compound.

10. The reader of claim 8 wherein the thermally isolating material is zirconium diboride.

11. The reader of claim 8 wherein the thermally isolating material is partially stabilized zirconia $ZrO_2$—$Y_2O_3$.

12. The reader of claim 8 wherein the thermally isolating material is deposited by magnetron sputtering through use of a photolithography mask.

13. The reader of claim 8 and further comprising:
a layer of diamond-like carbon deposited over the thermally isolating material in the pole tip recession adjacent the air bearing surface.

14. A transducing head formed on a rail of a substrate, the transducing head being recessed from the air bearing surface of the rail by a pole tip recession, the transducing head comprising:
a bottom shield;
a top shield;
a magnetoresistive read element positioned between the bottom shield and the top shield; and
a thermal barrier that coats the bottom shield, the top shield and the magnetoresistive read element in the pole tip recession, such that the magnetoresistive read element is separated from each of the bottom shield and the top shield by the barrier, and such that the barrier separates an air bearing surface of the rail from the magnetoresistive read element.

15. The transducing head of claim 14 wherein the thermal barrier is formed of a thermally isolating material.

16. The transducing head of claim 15 wherein the thermally isolating material is a zirconia compound.

17. The transducing head of claim 15 wherein the thermally isolating material is zirconium diboride.

18. The transducing head of claim 15 wherein the thermally isolating material is partially stabilized zirconia $ZrO_2$—$Y_2O_3$.

19. The transducing head of claim 15 wherein the thermally isolating material is deposited by magnetron sputtering through use of a photolithography mask.

20. The transducing head of claim 14 and further comprising:
a layer of diamond-like carbon deposited over the thermal barrier adjacent in the pole tip recession the air bearing surface.

21. A reader supported by a slider, the reader being recessed from an air bearing surface of the slider adjacent the reader by a pole tip recession, the reader comprising:
a magnetoresistive read transducer positioned between a top shield and a bottom shield;
means for thermally isolating the magnetoresistive read transducer, the means for thermally isolating having a media-opposing surface not extending beyond the air bearing surface, the means for thermally isolating comprising a coating of thermally isolating material fabricated over the magnetoresistive read transducer; and
a layer of diamond-like carbon deposited over means for thermally isolating the magnetoresistive read transducer, the layer of diamond-like carbon not extending beyond the air bearing surface.

22. The reader of claim 21 wherein the thermally isolating material is a zirconia compound.

23. The reader of claim 21 wherein the thermally isolating material is zirconium diboride.

24. The reader of claim 21 wherein the coating is formed by magnetron sputtering of the thermally isolating material onto the magnetoresistive read transducer through use of a photolithography mask.

25. The reader of claim 21 wherein the thermally isolating material is partially stabilized zirconia $ZrO_2$—$Y_2O_3$.

* * * * *

UNITED STATES PATENT AND TRADEMARK OFFICE
CERTIFICATE OF CORRECTION

PATENT NO.     : 6,556,389 B1
DATED          : April 29, 2003
INVENTOR(S)    : Zine-Eddine Boutaghou et al.

It is certified that error appears in the above-identified patent and that said Letters Patent is hereby corrected as shown below:

<u>Column 6,</u>
Line 20, delete "adjacent in the pole tip recession", insert -- in the pole tip recession adjacent --

Signed and Sealed this

Second Day of September, 2003

JAMES E. ROGAN
*Director of the United States Patent and Trademark Office*